United States Patent
Kim et al.

(10) Patent No.: US 9,641,831 B2
(45) Date of Patent: May 2, 2017

(54) APPARATUS AND METHOD FOR TRANSMITTING/RECEIVING MOVING PICTURE EXPERTS GROUP (MPEG) MEDIA TRANSPORT (MMT) SIGNALING MESSAGE FOR MEASUREMENT CONFIGURATION (MC) PROCESSING

(71) Applicant: Electronics and Telecommunications Research Institute, Daejeon (KR)

(72) Inventors: Chang Ki Kim, Daejeon (KR); Jeong Ju Yoo, Daejeon (KR); Jin Woo Hong, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 115 days.

(21) Appl. No.: 14/525,562

(22) Filed: Oct. 28, 2014

(65) Prior Publication Data
US 2015/0117243 A1    Apr. 30, 2015

(30) Foreign Application Priority Data

Oct. 28, 2013 (KR) .................. 10-2013-0128729
Sep. 25, 2014 (KR) .................. 10-2014-0128463

(51) Int. Cl.
*H04L 12/26* (2006.01)
*H04N 17/00* (2006.01)
(Continued)

(52) U.S. Cl.
CPC .......... *H04N 17/004* (2013.01); *H04N 21/24* (2013.01); *H04N 21/242* (2013.01)

(58) Field of Classification Search
CPC .... H04N 17/004; H04N 21/242; H04N 21/24; H04N 21/00; H04N 21/234309;
(Continued)

(56) References Cited

U.S. PATENT DOCUMENTS

2013/0173826 A1    7/2013 Kim et al.
2013/0342762 A1*   12/2013 Wang .................. H04N 19/70
                                                      348/583
(Continued)

OTHER PUBLICATIONS

ISO/IEC 23008-1:201x/PDAM 2, Aug. 16, 2013, pp. 1-17.*
(Continued)

*Primary Examiner* — Charles C Jiang
*Assistant Examiner* — Rose Clark
(74) *Attorney, Agent, or Firm* — William Park & Associates Ltd.

(57) ABSTRACT

A method of transmitting a Moving Picture Experts Group (MPEG) Media Transport (MMT) signaling message for Measurement Configuration (MC) processing in an MMT sending entity. The method includes generating an MC message with header information by setting a measurement mode (measurement_mode), which indicates information on a measurement start time (measurement_start_time) of a measurement item in an MMT receiving entity, to one of: an immediate measurement start, a measurement start at a predetermined time, a measurement start based on a predetermined condition, and an immediate measurement stop; and transmitting an MMT packet including the generated MC message to an MMT receiving entity.

17 Claims, 6 Drawing Sheets

(51) Int. Cl.
*H04N 21/24* (2011.01)
*H04N 21/242* (2011.01)

(58) Field of Classification Search
CPC ....... H04N 21/2381; H04N 21/440218; H04N 21/23614; H04N 21/4381; H04N 21/64322; H04N 21/4348; H04L 2012/5664; H04L 2012/6483
See application file for complete search history.

(56) References Cited

U.S. PATENT DOCUMENTS

| | | | | |
|---|---|---|---|---|
| 2014/0314080 | A1* | 10/2014 | Park | H04L 47/23 370/391 |
| 2015/0032845 | A1* | 1/2015 | Bouazizi | H04L 67/06 709/217 |
| 2015/0150055 | A1* | 5/2015 | Hwang | H04N 21/235 725/54 |

OTHER PUBLICATIONS

Chang Ki Kim et al. Proposed modification of MC signaling message in MMT, International Organisation for Standardisation iso/iec jtc1/sc29/wg11 Coding of Moving Pictures and Audio, Oct. 2013, ETRI, Yonsei University, Geneva, Switzerland.

\* cited by examiner

US 9,641,831 B2

APPARATUS AND METHOD FOR TRANSMITTING/RECEIVING MOVING PICTURE EXPERTS GROUP (MPEG) MEDIA TRANSPORT (MMT) SIGNALING MESSAGE FOR MEASUREMENT CONFIGURATION (MC) PROCESSING

CROSS-REFERENCE TO RELATED APPLICATION(S)

This application claims the benefit under 35 U.S.C. §119(a) of Korean Patent Application Nos. 10-2013-0128729, filed on Oct. 28, 2013, and 10-2014-0128463, filed on Sep. 25, 2014, in the Korean Intellectual Property Office, the entire disclosures of which are incorporated herein by references for all purposes.

BACKGROUND

1. Field

The following description relates to technology of a media transport service based on a Motion Picture Experts Group (MPEG) media transport system, and more specifically to an apparatus and method for transmitting/receiving an MPEG Media Transport (MMT) signaling message, required for the efficient processing of measurement configuration (MC).

2. Description of the Related Art

A Moving Picture Experts Group (MPEG) Media Transport (MMT) is new media transport standard technology whose development started since 2010 in an ISO/IEC WG11 (MPEG) system sub-working group.

The existing MPEG-2 system is a standard for packetization, synchronization, and multiplexing, etc., required for transmitting Audio Video (AV) content over the broadcast network, and standardizes MPEG-2 transport stream (TS) technology, which is now broadly used. However, the MPEG-2 TS is not efficient in a packet transmission environment of an Internet Protocol (IP)-based network.

In the ISO/IEC WG11 (MPEG), MMT standardization has started due to the recognition of the necessity for a new media transmission standard in consideration of a new media transmission environment and a media transmission environment that is anticipated in the future.

In the present MMT standard, a transport metrics is measured for a media delivery control through the signaling. The transport metrics may be, for example, a buffer status of a receiving entity, a round trip delay, and a Network Abstraction for Media (NAM) parameter, etc. In the present MMT standard, information on a measurement time, a measurement period, and a condition, which is included in the Measurement Configuration (MC) message, is required to be transmitted from a transmission side to a reception side.

However, the information included in the MC message is not defined enough for conditional data to be transmitted. Thus, with the information included in the MC message, the measurement value of the transport metrics cannot be generated precisely, which causes problems in controlling the delivery operation.

SUMMARY

Provided is an apparatus and method for generating a Measurement Configuration (MC) message, which transmits an MC message to more efficiently perform operations for measuring Moving Picture Experts Group (MPEG) Media Transport (MMT) transport data through an expansion of a measurement indication and a measurement period.

A method of transmitting a Moving Picture Experts Group (MPEG) Media Transport (MMT) signaling message for Measurement Configuration (MC) processing in an MMT sending entity includes generating an MC message with header information by setting a measurement mode (measurement_mode), which indicates information on a measurement start time (measurement_start_time) of a measurement item in an MMT receiving entity, to one of: an immediate measurement start, a measurement start at a predetermined time, a measurement start based on a predetermined condition, and an immediate measurement stop (immediate_measurement_stop); and transmitting an MMT packet including the generated MC message to an MMT receiving entity.

A method of receiving a Moving Picture Experts Group (MPEG) Media Transport (MMT) signaling message for Measurement Configuration (MC) processing in an MMT receiving entity includes receiving an MMT packet including an MC message from an MMT sending entity; determining a measurement time according to a value set in a measurement mode (measurement_mode) field included in the MC message, and measuring subjects for measuring a transport metrics at the determined measurement time; generating a feedback message including measurement report information on the subjects; and transmitting the MMT packet including the feedback message to the MMT sending entity.

An apparatus for transmitting a Moving Picture Experts Group (MPEG) Media Transport (MMT) signaling message for Measurement Configuration (MC) processing includes an MC message generator to generate an MC message with header information by setting a measurement mode (measurement_mode), which indicates information on a measurement start time (measurement_start_time) of a measurement item in an MMT receiving entity, to one of: an immediate measurement start, a measurement start at a predetermined time, a measurement start based on a predetermined condition, and an immediate measurement stop (immediate_measurement_stop); and an MMT packet transmitter to transmit an MMT packet including the generated MC message to an MMT receiving entity.

An apparatus for receiving a Moving Picture Experts Group (MPEG) Media Transport (MMT) signaling message for Measurement Configuration (MC) processing includes an MMT packet receiver to receive an MMT packet including an MC message from an MMT sending entity; a measurer to determine a measurement time according to a value set in a measurement mode (measurement_mode) included in the MC message, and measure subjects for measuring a transport metric at the determined measurement time; a feedback message generator to generate a feedback message including measurement report information on the subjects; and a feedback message transmitter to transmit the MMT packet including the feedback message to the MMT sending entity.

Figure 1:
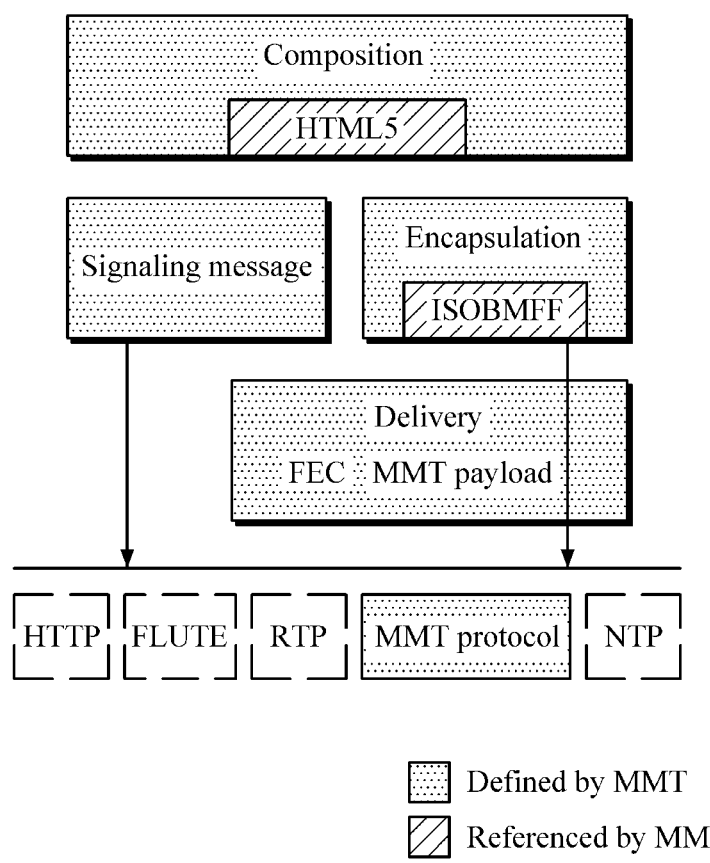
FIG. 1 is a diagram illustrating an example of a protocol stack that includes each functional area of a Moving Picture Experts Group (MPEG) Media Transport (MMT) system.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

In the following description, a detailed description of known functions and configurations incorporated herein will be omitted when it may obscure the subject matter with unnecessary detail.

Before describing the exemplary embodiments, terms used throughout this specification are defined. These terms are defined in consideration of functions according to exemplary embodiments, and can be varied according to a purpose of a user or manager, or precedent and so on. Therefore, definitions of the terms should be made on the basis of the overall context.

FIG. 1 is a diagram illustrating an example of a protocol stack that includes each functional area of a MPEG Media Transport (MMT) system.

Referring to FIG. 1, an MMT layer is composed of four functional areas including an encapsulation layer, a delivery layer, a signaling layer, and a composition layer.

The encapsulation layer may manage functions, such as packetization, fragmentation, synchronization, and multiplexing, etc., of transported media. The delivery layer may perform network flow multiplexing, network packetization, and Quality of Service (QoS) control, and the like, of media, which are transferred through a network.

Figure 2:
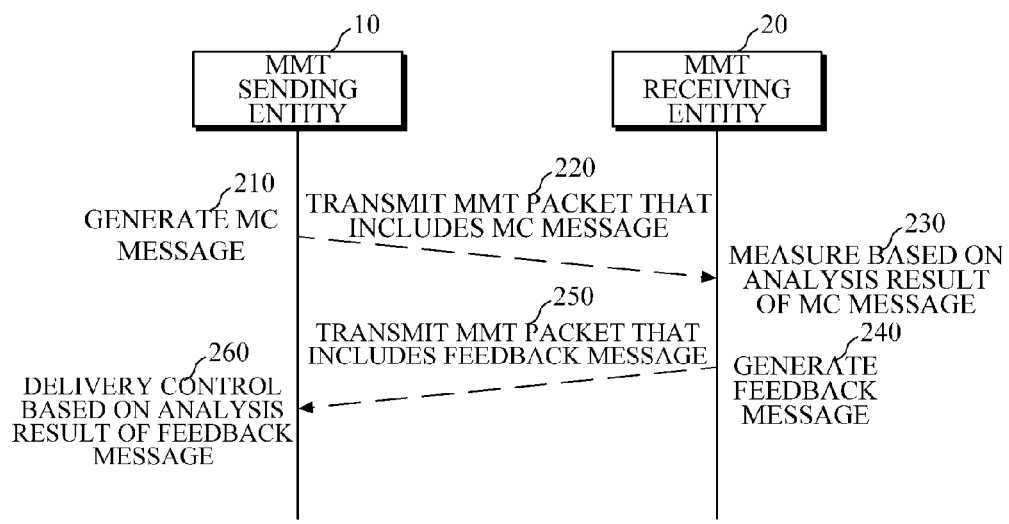
FIG. 2 is a diagram illustrating an example of an operation process of measuring an MMT transport metrics.

FIG. 2 is a diagram illustrating an example of an operation process of measuring an MMT transport metrics.

Referring to FIG. 2, an MMT sending entity 10 and an MMT receiving entity 20 are illustrated. Here, the MMT sending entity 10 is a device that delivers media information, and may be both a server and a client. The MMT receiving entity 20 is a device that receives the media information and plays, and may include a media playing client, such as a smartphone and a smart pad.

The MMT sending entity 10 needs to measure transport metrics in the MMT receiving entity 20 for a delivery control in transmitting media, and generates a measurement configuration (MC) message for setting of required measurement information and condition in 210. In addition, the MMT sending entity 10 packetizes the generated MC message into the MMT packet, and delivers the MMT packet to the MMT receiving entity 20 in 220. Here, information including a measurement item, a measurement execution time, a measurement period, and a measurement report is set in the MC message.

The MMT receiving entity 20 analyzes the received MC message, measures the set measurement item for the measurement execution time, and collects the measurement result in 230. Then, the MMT receiving entity 20 repeatedly measures the measurement item according to the measurement period. Then, the MMT receiving entity 20 generates a feedback message that includes the collected measurement report information in 240. Here, the feedback message may be composed of a reception quality feedback (RQF) message or a Network Abstraction for Media (NAM) feedback signaling message. The MMT receiving entity 20 packetizes the feedback message into the MMT packet, and delivers the MMT packet to the MMT receiving entity 10 in 250.

Then, the MMT sending entity 10 receives and analyzes the feedback message, and controls a media delivery operation based on the analysis result included in the feedback message in 260.

Next, an MC message format structure that is defined in MMT standards (ISO/IEC 23008-1) is shown as follows in <Table 1>.

TABLE 1

| Syntax | Values | No. of bits | Mnemonic |
|---|---|---|---|
| Measurement configuration ( ){ | | | |
|    message_id | | 16 | |
|    version | | | |
|    length | | 8 | |
|    message_payload{ | | 16 | |
|      measurement_item | | | |
|         measurement_ execution time{ | | 2 | |
|            immediately | | | |
|            measurement_start_time | | | |
|            measurement_start_condition | | | |
|         } | | | |
|         measurement_period{ | | 2 | |
|            once | | | |
|            periodic_measure_time | | | |
|            measure_condition | | | |
|         } | | | |
|         measurement_report{ | | | |
|            server_address | | | |
|            reportType | | 32 | |
|            if (reportType == 0x00) { | | 1 | |
|               reception_quality_feedback( ) | | | |
|            } else if (reportType==0x01){ | | | |
|            } | | | |
|         } | | | |
|    } | | | |
| } | | | |

Referring to <Table 1>, the MC message is largely composed of a header, included in the MMT signaling message in common, and a message payload for the MC. The header is composed of fields including 'message_id', 'version', and 'length', and the payload is necessarily composed of fields including 'measurement_item', 'measurement_execution_time', 'measurement_period', and 'measurement_report'. Here, an item to be measured is set in the 'measurement_item' field; a time for measuring the measurement item is set in the 'measurement_execution_time' field; a measurement period is set in the 'measurement_period' field; and a destination address, where the measurement result is to be fed back, and information on a feedback message type are recorded in the 'measurement_report' field.

However, the MC message defined in current MMT standards (ISO/IEC 23008-1) has the following problems.

First, since the 'measurement_execution_time' is composed of two bits only, the MC message is not capable of delivering enough information on a start time and a start condition. In other words, the 'measurement_execution_time' may be classified into types of 'immediately', 'measurement_start_time', and 'measurement_start_condition' by using two bits. In a case in which a type of 'measurement_execution_time' is 'immediately', two bits are sufficient to deliver enough information, which causes no problems. However, in a case in which a type of 'measurement_execution_time' is 'measurement_start_time' or 'measurement_start_condition', the start time and the start condition are required to be delivered together; however, only two bits are insufficient to deliver the information as described above, and also an additional information field for the delivery has not been defined in the current MC message.

Second, the MC message is not capable of delivering information on a measurement stop time.

Third, the 'measurement_period' is composed of two bits, which is not capable of defining a measurement period variously. In other words, the type of the 'measurement_period' is classified to 'once', 'periodic_measure_time', and 'measure_condition' by using two bits. In a case in which a type of 'measurement_period' is 'once', two bits are sufficient to deliver enough information, which causes no problems. However, in a case in which a type of 'measurement_period' is 'periodic_measure_time' or 'measure_condition', the start time and the start condition are required to be delivered together; however, only two bits are not enough to deliver the information as described above, and also an additional information field for the delivery has not been defined in the current MC message.

Fourth, an address to receive the measurement result is supposed to be notified to the 'measurement_report', the address is currently limited only to an Internet Protocol version 4 (IPv4) address, but may be extended to an IPv6 address.

To sum up, since information of the measurement start time, the measurement period, and the measurement report, which are included in the MC message, are not complete, there has been no method of acquiring the measurement result with the information, thus generating the wrong transport metrics measurement value and notifying the measurement end time in the conventional operation of measuring MMT transport data.

However, the present disclosure provides an apparatus and method for generating an MC message to more effectively perform an operation of measuring an MMT transport metrics through extension of a measurement mode and a measurement period by solving the problem of the incomplete MC of which message is defined in the MMT standards.

A syntax structure of the MC message is as follows, which distinguishes a measurement mode and includes only minimum information needed according to the measurement mode.

TABLE 2

| Syntax | Values | No. of bits | Mnemonic |
|---|---|---|---|
| Measurement _message( ) { | | | |
|   message_id | | 16 | uimsbf |

TABLE 2-continued

| Syntax | Values | No. of bits | Mnemonic |
|---|---|---|---|
|   version | | 8 | uimsbf |
|   length | | 16 | uimsbf |
|   message payload { | | | |
|     reserved | '111111' | 6 | bslbf |
|     measurement_mode | | 2 | bslbf |
|     if(measurement_mode !=11 ) { | | | |
|       if(measurement_mode ==01){ | | | |
|         measurement_start_time | | 32 | uimsbf |
|       }else if(measurement_mode ==10) { | | | |
|         measurement start condition( ) | | | |
|       } | | | |
|     measurement_stop_time | | 32 | uimsbf |
|     measurement_period | | 32 | uimsbf |
|     measurement_report{ | | | |
|       server_address{ | | | |
|         MMT_general_location_info( ) | | 32 | |
|       } | | | |
|       report_type | | 8 | bslbf |
|     } | | | |
|   } | | | |
| } | | | |
| } | | | |

Referring to <Table 2>, the MMT MC message has the following individual semantics regarding each of the fields except for a common header of three signaling messages.

①̂ 'measurement_mode': indicates a time when an MMT receiving entity will start measurement of a transport metrics item, wherein the semantics of values set in the measurement mode is defined as shown in the following <Table 3>.

TABLE 3

| Value | Description |
|---|---|
| 00 | start measurement immediately and stop measurement at the appointed time |
| 01 | start and stop measurement at the appointed time |
| 10 | start measurement at the measurement condition |
| 11 | stop measurement immediately |

②̂ 'measurement_start_time': is information on a time when the MMT receiving entity starts measuring the measurement item, and is expressed in a 32-bit network time protocol (NTP) timestamp format as Coordinated Universal Time (UTC). However, according to an exemplary embodiment, the 'measurement_start_time' is included only when a value of the measurement mode is '01'.

③̂ 'measurement_start_condition': indicates a specific condition where the MMT receiving entity starts measurement. For example, the specific condition may include a receiver buffer status or a reception channel status. However, according to an exemplary embodiment, the 'measurement_start_condition' is included only when a value of the measurement mode is '10'.

④̂ 'measurement_stop_time': is a time when the MMT receiving entity stops measuring the measurement item, and is expressed in a 32-bit network time protocol (NTP) timestamp format as a Coordinated Universal Time (UTC). However, this value is '0x0000', which means that the 'measurement_stop_time' has not been set. So, the value is '0x0000', which means that MMT receiving entity periodically measures the measurement item with the measurement period until 'immediate_measurement_stop' is received. However, according to an exemplary embodiment, the 'measurement_stop_time' is all included except when a value of the measurement mode is '11'.

⑤ 'measurement_period': indicates by which period the MMT receiving entity measures the transport metrics. According to an exemplary embodiment, the 'measurement_period' may be composed of 32 bits to set sufficient measurement conditions. Also, '0x0000' indicates only one measurement, and its unit is a second. The values other than '0x0000' indicate a period for measurement.

⑥ 'measurement_report': is a field to provide information for a measurement report, and includes a server address, where the MMT receiving entity transmits the measurement result, and a template used for the measurement report.

⑦ 'server_address': indicates a location of a server that receives the measurement result of the transmitted data, and according to an exemplary embodiment, is changed from an IPv4 address to 'MMT_general_location_info'.

⑧ 'report_type': indicates a type of a request for a measurement report, wherein the semantics of values set in the 'report_type' is defined as shown in the following <Table 4>.

TABLE 4

| Value | Description |
| --- | --- |
| 0000 0000 | report type is reception . . . quality . . . feedback |
| 0000 0001 | report type is NAM_feedback |
| 0000 0010 | report type is reception_ quality_feedback and NAM_feedback |
| 0000 0011~ 1111 1111 | reserved for future use |

Figure 3:
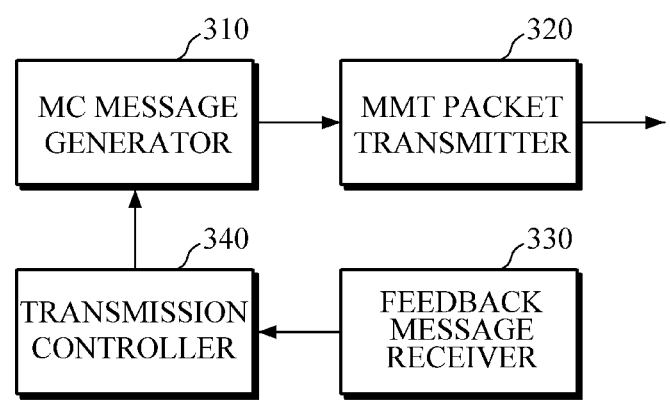
FIG. 3 is a diagram illustrating an example of an apparatus for transmitting an MMT signaling message for MC processing according to an exemplary embodiment.

FIG. 3 is a diagram illustrating an example of an apparatus for transmitting an MMT signaling message for MC processing according to an exemplary embodiment. Here, the apparatus may be understood as included in an MMT sending entity.

Referring to FIG. 3, the apparatus includes an MC message generator 310, an MMT packet transmitter, a feedback message receiver 330, and a transmission controller 340.

The MC message generator 310 generates an MC message together with header information by setting a 'measurement_mode', for setting measurement time information of the MMT receiving entity, and a measurement start time and stop time, a measurement period, and a report type, etc., according to the measurement mode.

The 'measurement_mode' is set to request one of an immediate measurement start, a measurement start at a predetermined time, a measurement start based on a predetermined condition, and an immediate measurement stop.

Thus, in a case in which the 'measurement_mode' is set to 'immediate_measurement_start', the MC message generator 310 sets 'measurement_stop_time' to an appointed time. Also, in a case in which the 'measurement_mode' is set to 'immediate_measurement_stop', the MC message generator 310 does not set another field of the MC message. In a case in which the 'measurement_mode' is set to 'measurement_start' at an appointed time, the MC message generator 310 sets the 'measurement_start_time' and the 'measurement_stop_time' to an appointed time, respectively. In addition, in a case in which the 'measurement_mode' is set to the 'predetermined_condition_measurement_start', the MC message generator 310 sets the 'measurement_start_condition' and the 'measurement_stop_time'. The MC message generator 310 sets 'measurement_period' that is composed of 32 bits. Moreover, the MC message generator 310 includes 'server_address' where the MMT receiving entity transmits the measurement result, wherein the server address is set not to a conventional IPv4 address format, but to an address format of 'MMT_general_location_info'. The MMT packet transmitter 320 transmits, to the MMT receiving entity, an MMT packet that includes the generated MC message.

Figure 4:
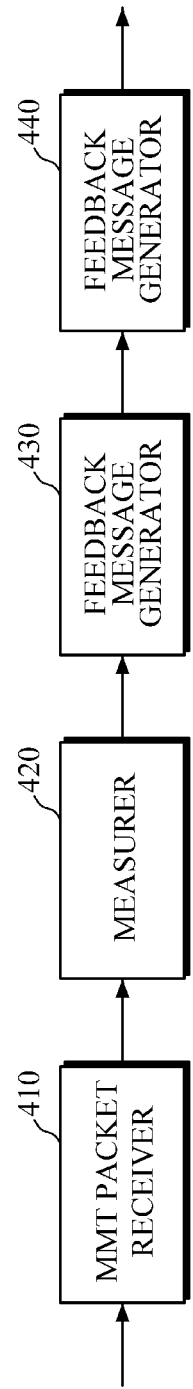
FIG. 4 is a diagram illustrating an example of an apparatus for receiving an MMT signaling message for MC processing according to an exemplary embodiment.

The feedback message receiver 330 receives a feedback message that is transmitted from the MMT receiving entity 20, and the transmission controller 340 controls the transmission to the MMT receiving entity 20 according to the measurement result included in the feedback message FIG. 4 is a diagram illustrating an example of an apparatus for receiving an MMT signaling message for MC processing according to an exemplary embodiment. Here, the apparatus may be understood as being included in an MMT receiving entity.

Referring to FIG. 4, the apparatus includes an MMT packet receiver 410, a feedback message generator 430, and a feedback message transmitter 440.

The MMT packet receiver 410 receives, from the MMT sending entity, an MMT packet that includes an MC message.

The measurer 420 determines a measurement time according to a value set in a 'measurement_mode' field included in the MC message, and measures subjects for measuring a transport metrics at the determined measurement time. Also, in a case in which the 'measurement_mode' field is set to 'immediate_measurement_start', the measurer 420 measures the measurement subjects from the present to an appointed time set in 'measurement_stop_time'. In a case in which the 'measurement_mode' is set to 'immediate_measurement_stop', the measurer 420 immediately stops the measurement of the subjects that are being performed currently. In a case in which the 'measurement_mode' is set to 'measurement_start' at an appointed time, the measurer 420 performs measurements from the time set in a 'measurement_start_time' field to the time set in the 'measurement_stop_time' field. In a case in which the 'measurement_mode' is set to 'measurement_start' based on a specific condition, the measurer 420 performs measurements from the time set in a 'measurement_start_condition' field included in the MC message to the time set in the 'measurement_stop_time' field included in the MC message.

The measurer 420 periodically measures the measurement subjects for a measurement time according to a value set in a 'measurement_period' field that is composed of 32 bits.

The feedback message generator 430 generates a feedback message that includes measurement report information on the measurement subjects.

The feedback message transmitter 440 transmits the MMT packet that includes the feedback message to the MMT sending entity. The feedback message transmitter 440 transmits the feedback message to an address that is set in 'server_address', which is set to the address format of 'MMT_general_location_info'.

Figure 5:
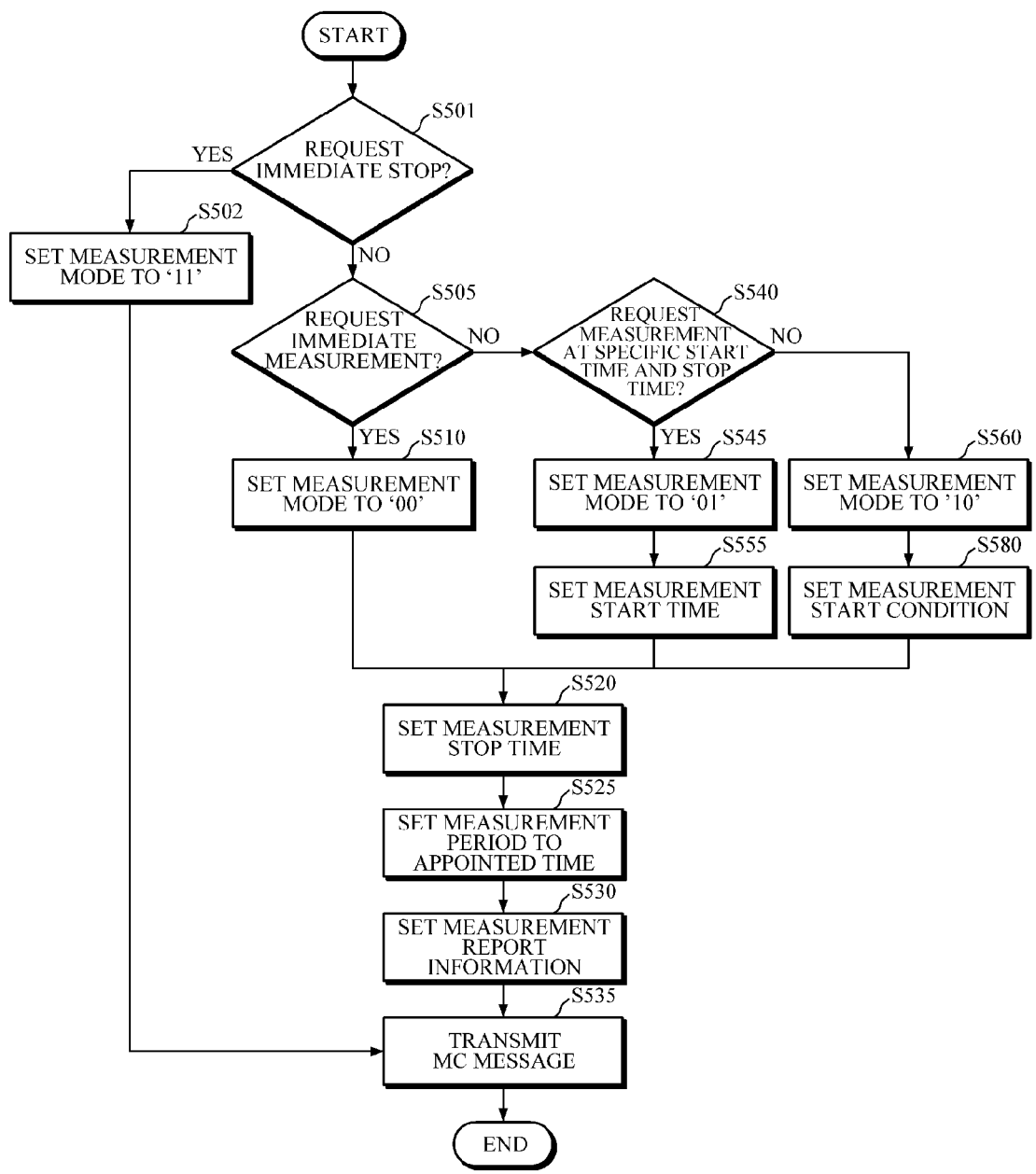
FIG. 5 is a flowchart illustrating an example of a method of transmitting an MMT signaling message for MC processing according to an exemplary embodiment.

FIG. 5 is a flowchart illustrating an example of a method of transmitting an MMT signaling message for MC processing according to an exemplary embodiment.

Referring to FIG. 5, an MMT sending entity generates an MC message together with header information by setting 'measurement_mode', for setting measurement time information, and a measurement time and period, etc., needed according to the 'measurement_mode'. Specifically, the MMT sending entity sets the 'measurement_mode' to request an immediate measurement start, a measurement start at a predetermined time, a measurement start based on a predetermined condition, and an immediate measurement stop.

The MMT sending entity determines whether to request an immediate measurement stop to the MMT receiving entity in 501. Upon the determination in 501, in a case in which the immediate measurement stop has been requested to the MMT receiving entity from operation 501, the MMT sending entity sets the 'measurement_mode' to '11' in 502, which proceeds to 535 to be described later.

Otherwise, upon the determination in 501, in a case in which the MMT sending entity has not requested an immediate measurement stop to the MMT receiving entity, the MMT sending entity determines whether to request an immediate measurement start to the MMT receiving entity in 505. Upon the determination in 505, in a case in which the MMT sending entity requests the immediate measurement start to the MMT receiving entity, the MMT sending entity sets the 'measurement_mode' to '00' in 510.

In addition, the MMT sending entity sets a 'measurement_ stop_time' field in 520. Here, the 'measurement_ stop_ time' field sets UTC into an NTP timestamp format. Also, in an exemplary embodiment, '0x0000' may be set in the 'measurement_stop_time' field so as not to set the 'measurement_stop_time' to a specific value. Likewise, in a case in which the 'measurement_stop_time' is set to '0x0000', the MMT sending entity may transmit an MC message that is set to '11' meaning 'immediately stopping' to the 'measurement_mode' field to stop the measurement.

Then, the MMT sending entity sets 'measurement_period' in 525. In an exemplary embodiment, in order not to set the 'measurement_period' to a specific value, the 'measurement_period' is set to '0x0000' to measure the 'measurement_period' only once in 530. Here, in an exemplary embodiment, 'measurement_report' includes a server address where the MMT receiving entity transmits the measurement result, but the server address, which is not included in a conventional IPv4 address format, is set to an address format of 'MMT_general_location_info'. Then, the MMT sending entity generates the MC message together with common header information and transmits the MC message to the MMT receiving entity in 535.

On the other hand, upon the determination in 505, in a case in which the MMT receiving entity has not requested an immediate measurement start, the MMT sending entity determines whether to request the measurement at a specific start time and stop time in 540.

Upon the determination in 540, in a case in which the MMT sending entity requests the measurement at a specific start time and stop time, the MMT sending entity sets the 'measurement_mode' to '01' that is 'start and stop measurement at the appointed time' in 545. In addition, in such a case, since the 'MMT sending entity' is necessarily required to set the 'measurement_start_time' field and the 'measurement_stop_time' field to a desired specific value in 555 and 520, the 'measurement_start_time' and the 'measurement_ stop_time' may be UTC time with an NTP timestamp format as described above. Then, operations 520 to 535 are performed, which are the same as described above.

However, Upon the determination in 540, in a case in which the MMT sending entity has not requested measurement at a specific start time and stop time, that is, intending to set a measurement start condition, the MMT sending entity sets the 'measurement_mode' to '10' that indicates 'measurement start condition' in 560. In such a case, the 'measurement_start_condition' field is required to be set in 580. Here, the 'measurement_start_condition' may include a 'receiver buffer status' or a 'reception channel status'. Then, operations 520 to 535 are performed, which are the same as described above.

Figure 6:
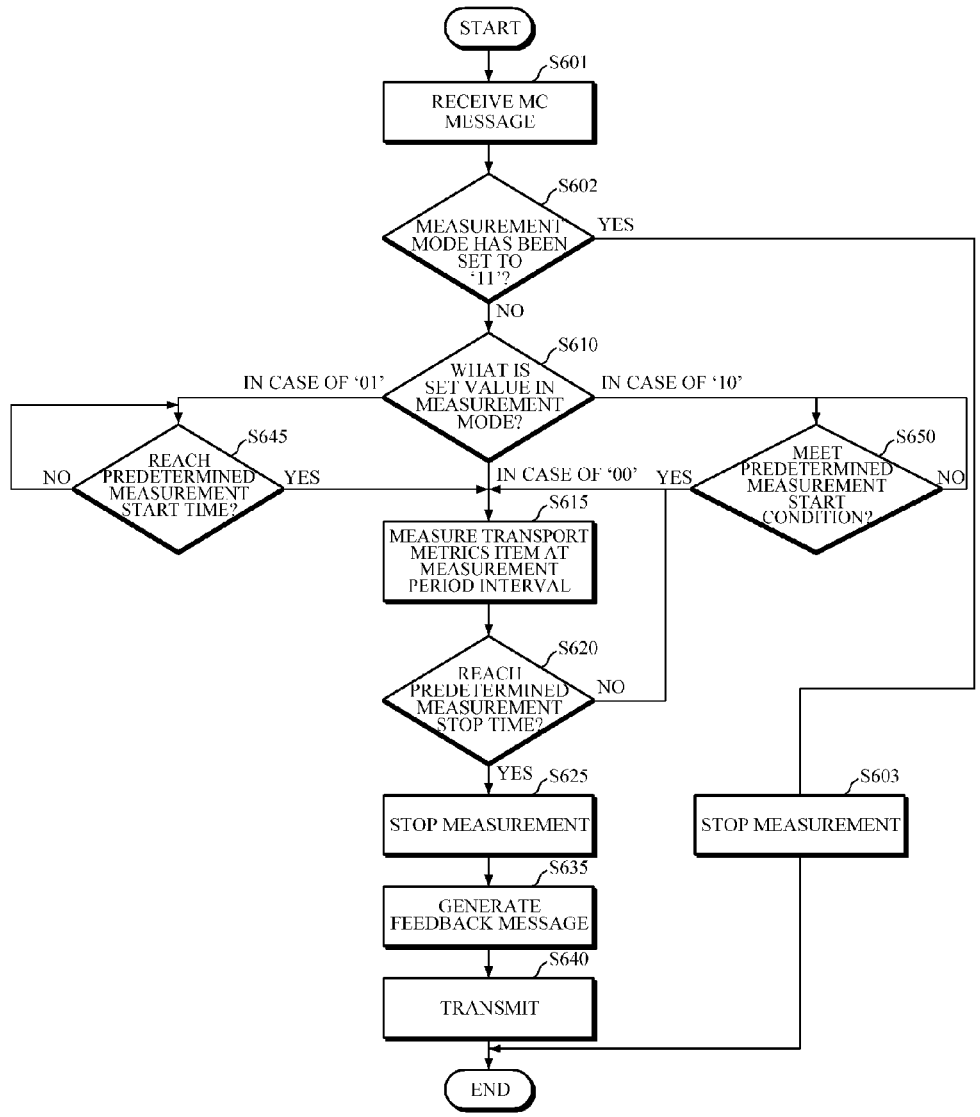
FIG. 6 is a flowchart illustrating an example of a method of receiving an MMT signaling message for MC processing according to another exemplary embodiment.

FIG. 6 is a flowchart illustrating an example of a method of receiving an MMT signaling message for MC processing according to another exemplary embodiment.

Referring to FIG. 6, an MMT receiving entity receives an MC message from an MMT sending entity in 601. Then, the MMT receiving entity determines a measurement time according to which value is set in the 'measurement_mode' field of the received MC message.

First, the MMT receiving entity determines whether the measurement mode has been set to '11' in 602. Upon the determination in 602, in a case in which the measurement mode has been set to '11', the measurement is stopped in 603.

Otherwise, upon the determination in 602, in a case in which the measurement mode has not been set to '11', the MMT receiving entity performs the corresponding operation according to the value that is set in the measurement mode in 610.

In other words, upon the determination in 610, in a case in which the measurement mode is '00', the MMT receiving entity immediately measures the transport metrics required for the report-typed message that the MMT sending entity has requested, wherein the MMT receiving entity periodically measures the transport metrics referring to the 'measurement_period' received from the MMT sending entity in 615. In a case in which the 'measurement_period' field has been set to '0x0000' indicating one measurement, the MMT receiving entity does not perform the measurement any more. The MMT receiving entity monitors whether the present time has reached the 'measurement_stop_time' field until the time that is set in its field, while periodically measuring the transport metrics in 620. However, in a case in which the 'measurement_stop_time' field has been set to '0x0000' indicating that a specific stop time has not been set, the operation 620 may include monitoring whether the 'measurement_mode' field, which is set to '11' indicating 'immediately stop', is received.

Upon the determination of the monitoring in 620, in case of the 'measurement_stop_time', the MMT receiving entity stops the measurement for the measurement item in 625.

Then, the MMT receiving entity collects the measurement result to generate a feedback message referring to measurement report information in 635.

Then, the MMT receiving entity transmits the generated feedback message to the MMT sending entity, and specifically to an address set in a server address set to an address format of 'MMT_general_location_info' included in 'measurement_report' in 640.

However, upon the determination in 610, in a case in which the measurement mode is '01', the MMT receiving entity monitors a specific time that is set in the 'measurement_start_time' included in the MC message in 645, and if the specific time is reached, the process proceeds to 615. However, upon the determination in 610, in a case in which the measurement mode is '10', the MMT receiving entity monitors a specific condition that is set in the 'measurement_start_condition' included in the MC message in 650, and if the specific condition is met, the process proceeds to 615.

In performing operations of measuring transport metrics in an MMT-based system, exemplary embodiments may avoid the occurrence of wrong measurement results caused by the imprecisely delivered measurement time and measurement period, etc., when the MC message is delivered from the MMT sending entity to the MMT receiving entity.

What is claimed is:

1. A method of transmitting a Moving Picture Experts Group (MPEG) Media Transport (MMT) signaling message for Measurement Configuration (MC) processing in an MMT sending entity, the method comprising:
generating an MC message with header information by setting a measurement mode (measurement_mode), which indicates information on a measurement start time (measurement_start_time) of a measurement item in an MMT receiving entity, to one of:
an immediate measurement start, a measurement start at a predetermined time, a measurement start based on a predetermined condition, and an immediate measurement stop (immediate_measurement_stop); and transmitting an MMT packet including the generated MC message to an MMT receiving entity,
wherein in a case in which the measurement mode is not set to the immediate measurement stop, the generating of the MC message comprises setting a measurement stop time (measurement_stop_time), a measurement period (measurement_period), and a measurement report (measurement_report), and
wherein the measurement stop time is expressed in a 32-bit network time protocol (NTP) timestamp format as a Coordinated Universal Time (UTC), wherein the measurement stop time is set to '0x0000', which indicates that the MMT receiving entity periodically measures the measurement item with the measurement period until the immediate measurement stop is received.

2. The method of claim 1, wherein the measurement period is 32 bit.

3. The method of claim 1, wherein the measurement report comprises a server address where the MMT receiving entity transmits a measurement result and a report type.

4. A method of receiving a Moving Picture Experts Group (MPEG) Media Transport (MMT) signaling message for Measurement Configuration (MC) processing in an MMT receiving entity, the method comprising:
receiving an MMT packet including an MC message from an MMT sending entity;
determining a measurement time according to a value set in a measurement mode (measurement_mode) field included in the MC message, and periodically measuring transport metrics at the determined measurement time according to a value set in a measurement period (measurement_period) that is 32-bit;
generating a feedback message including measurement report information on the subjects; and
transmitting the MMT packet including the feedback message to the MMT sending entity,
wherein, in a case in which the measurement mode is not set to the immediate measurement stop, the measurement stop time is expressed in a 32-bit network time protocol (NTP) timestamp format as a Coordinated Universal Time (UTC), and the measurement stop time is set to '0x0000', the periodically measuring transport metrics comprises periodically measuring the measurement item with the measurement period until the immediate measurement stop is received.

5. The method of claim 4, wherein in a case in which the measurement mode is set to an immediate measurement start, the measuring of the transport metrics comprises measuring from a current time to a predetermined time that is set in a measurement stop time (measurement_stop_time) included in the MC message.

6. The method of claim 4, wherein in a case in which the measurement mode is set to an immediate measurement stop, the measuring of the transport metrics comprises immediately stopping the measurement being performed.

7. The method of claim 4, wherein in a case in which the measurement mode is set to a measurement start at a predetermined time, the measuring of the transport metrics comprises measuring from a time set in a measurement start time (measurement_start_time) included in the MC message to a time set in a measurement stop time (measurement_stop_time) included in the MC message.

8. The method of claim 4, wherein in a case in which the measurement mode is set to a measurement start based on a predetermined condition, the measuring of the transport metrics comprises measuring from a time set in a measurement start condition (measurement_start_condition) included in the MC message to a time set in a measurement stop time included in the MC message.

9. The method of claim 4,
wherein the MC message further comprises a server address, and
wherein the transmitting of the MMT packet comprises transmitting the feedback message to an address set in the server address.

10. An apparatus for transmitting a Moving Picture Experts Group (MPEG) Media Transport (MMT) signaling message for Measurement Configuration (MC) processing, the apparatus comprising:
an MC message generator configured to generate an MC message with header information by setting a measurement mode (measurement_mode), which indicates information on a measurement start time (measurement_start_time) of a measurement item in an MMT receiving entity, to one of:
an immediate measurement start, a measurement start at a predetermined time, a measurement start based on a predetermined condition, and an immediate measurement stop (immediate_measurement_stop); and
an MMT packet transmitter configured to transmit an MMT packet including the generated MC message to an MMT receiving entity,
wherein the measurement start based on a predetermined condition comprises a receiver buffer status or a reception channel status,
wherein in a case in which the measurement mode is not set to the immediate measurement stop, the MC message generator sets a measurement stop time (measurement stop time), a measurement period (measurement period), and a measurement report (measurement report), and
wherein the measurement stop time is expressed in a 32-bit network time protocol (NTP) timestamp format as a Coordinated Universal Time (UTC), and
wherein the measurement stop time which is set to '0x0000' indicates that the MMT receiving entity periodically measures the measurement item with the measurement period until the immediate measurement stop is received.

11. An apparatus for receiving a Moving Picture Experts Group (MPEG) Media Transport (MMT) signaling message for Measurement Configuration (MC) processing, the apparatus comprising:
an MMT packet receiver configured to receive an MMT packet including an MC message from an MMT sending entity;
a measurer configured to determine a measurement time according to a value set in a measurement mode (measurement_mode) included in the MC message and to measure a transport metric at the determined measurement time according to a value set in a measurement period (measurement_period) that is 32-bit;
a feedback message generator configured to generate a feedback message including measurement report information on the subjects; and
a feedback message transmitter configured to transmit the MMT packet including the feedback message to the MMT sending entity,
wherein, in a case in which the measurement mode is not set to the immediate measurement stop, the measurement stop time is expressed in a 32-bit network time protocol (NTP) timestamp format as a Coordinated Universal Time (UTC), and the measurement stop time is set to '0x0000', the measurer periodically measures the measurement item with the measurement period until the immediate measurement stop is received.

12. The method of claim 1, wherein in a case in which the measurement mode is set to the measurement start at a predetermined time, the generating of the MC message further comprises setting the measurement start time in a 32-bit network time protocol (NTP) timestamp format as Coordinated Universal Time (UTC).

13. The method of claim 1, wherein in a case in which the measurement mode is set to the measurement start based on a predetermined condition, the generating of the MC message further comprises setting a measurement start condition (measurement_start_condition).

14. The method of claim 1, wherein the measurement start based on a predetermined condition comprises a receiver buffer status or a reception channel status.

15. The method of claim 4, wherein in a case in which the measurement mode is set to the measurement start at a predetermined time, the measurement start time is set in a 32-bit network time protocol (NTP) timestamp format as Coordinated Universal Time (UTC).

16. The apparatus of claim 10, wherein in a case in which the measurement mode is set to the measurement start at a predetermined time, the MC message generator is configured to set the measurement start time in a 32-bit network time protocol (NTP) timestamp format as Coordinated Universal Time (UTC).

17. The apparatus of claim 11, wherein in a case in which the measurement mode is set to the measurement start at a predetermined time, the measurement start time is set in a 32-bit network time protocol (NTP) timestamp format as Coordinated Universal Time (UTC).

* * * * *